Aug. 6, 1957     E. C. RANEY     2,801,798
MIXING VALVE

Filed March 2, 1956     4 Sheets-Sheet 1

INVENTOR.
ESTEL C. RANEY

Aug. 6, 1957  E. C. RANEY  2,801,798
MIXING VALVE
Filed March 2, 1956  4 Sheets-Sheet 2

INVENTOR.
ESTEL C. RANEY
BY

Aug. 6, 1957  E. C. RANEY  2,801,798
MIXING VALVE

Filed March 2, 1956  4 Sheets-Sheet 4

INVENTOR.
ESTEL C. RANEY

United States Patent Office 2,801,798
Patented Aug. 6, 1957

2,801,798

MIXING VALVE

Estel C. Raney, Fort Lauderdale, Fla., assignor to Ranco Incorporated, Columbus, Ohio, a corporation of Ohio Application March 2, 1956, Serial No. 569,033

2 Claims. (Cl. 236—12)

The present invention relates to a fluid mixing valve particularly suitable for controlling thermostatically the mixture of hot and cold water to be fed into the tub of a washing machine.

The principal object of the invention is the provision of a thermostatically controlled mixing valve mechanism having a dial-type adjusting member or the like, which can be set manually to cause water to be discharged at any temperature desired, within a range, during one water supply cycle of a washing operation, and after this water supply cycle has terminated the adjusting member automatically returns to a normal setting, such as a relatively low temperature setting. In carrying out the invention the adjusting member is biased to a normal setting, such as that desired for rinsing, and a slip-clutch is provided which is activated by the pressure of water flowing from the valve mechanism to retain the member in any temperature adjusting position to which it may be moved manually, the clutch being arranged to slip by the manual effort on the adjusting member. When the valve shuts off the water supply after a tub filling operation the clutch is thereby de-activated and it releases the adjusting member and the member is automatically biased to the normal setting.

Another object of the invention is the provision of a thermostatically operated mixing valve in which the thermostatic element comprises a liquid impervious shell or casing containing a thermostatic material and located in the stream of the mixed fluid, the casing having an opening through which a plunger is movable by expansion of the thermostatic material, and a seal being interposed between the casing and body of the casing of the thermostatic element to isolate the plunger and the opening in which it moves from the fluid passing through the valve so that the moving or flexing parts of the thermostat are not subjected to the action of the fluid.

Still a further object of the invention is the provision of adjusting means for a water mixing valve for washing machines and the like which permits dial-type selective adjustments of both the wash water temperatures and the rinse water temperatures.

Other objects and advantages of the invention will be apparent from the following description of a preferred embodiment of the invention, reference being made to the accompanying drawings wherein Fig. 1 is a side elevational view of a water mixing valve for an automatic clothes washing machine;

Figure 6:
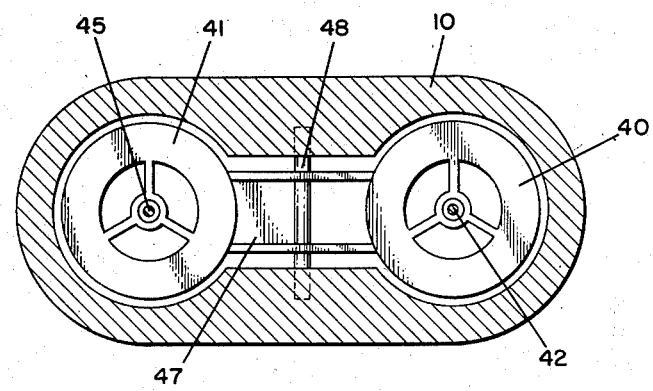
Fig. 6 is a sectional view taken substantially along line 6—6 of Fig. 5.
Figure 7:
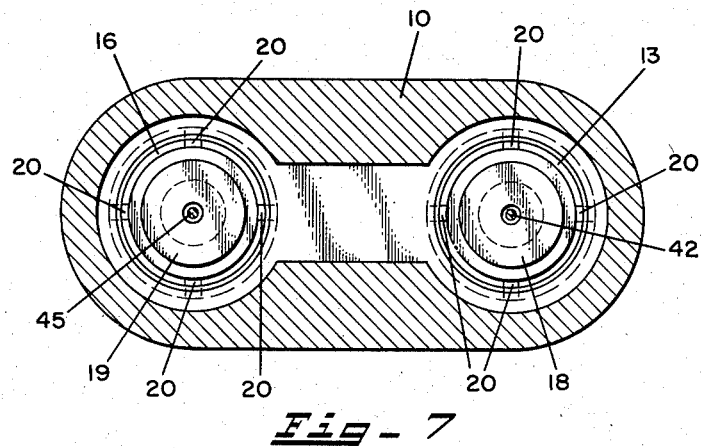
Fig. 7 is a sectional view taken along line 7—7 of Fig. 5.

In the form shown, the valve mechanism comprises a housing or body formed of two members 9 and 10 which are secured together by screws with a sealing gasket therebetween as shown, and the body may be suitably attached to an automatic washing machine, not shown. The part 10 has cold and hot water inlets 11, 12, respectively, which are threaded to receive couplings from cold and hot water supply hoses. As may be seen in Figs. 5, 6 and 7 the hot water inlet has an annular valve seat 13 through which hot water flows directly into a cylindrical mixing chamber 14 formed in the body part 9, and the cold water inlet has an annular valve seat 16 therein through which the cold water enters a passage 17 in the body which leads into the lower side of the mixing chamber so that the cold water is thoroughly mixed with the hot water. The annular inlets 13 and 16 are formed by seat members 18, 19 each supported by four lugs 20 secured between the inner ends of the threaded couplings 11, 12 and the body proper 10, as shown.

Figure 3:
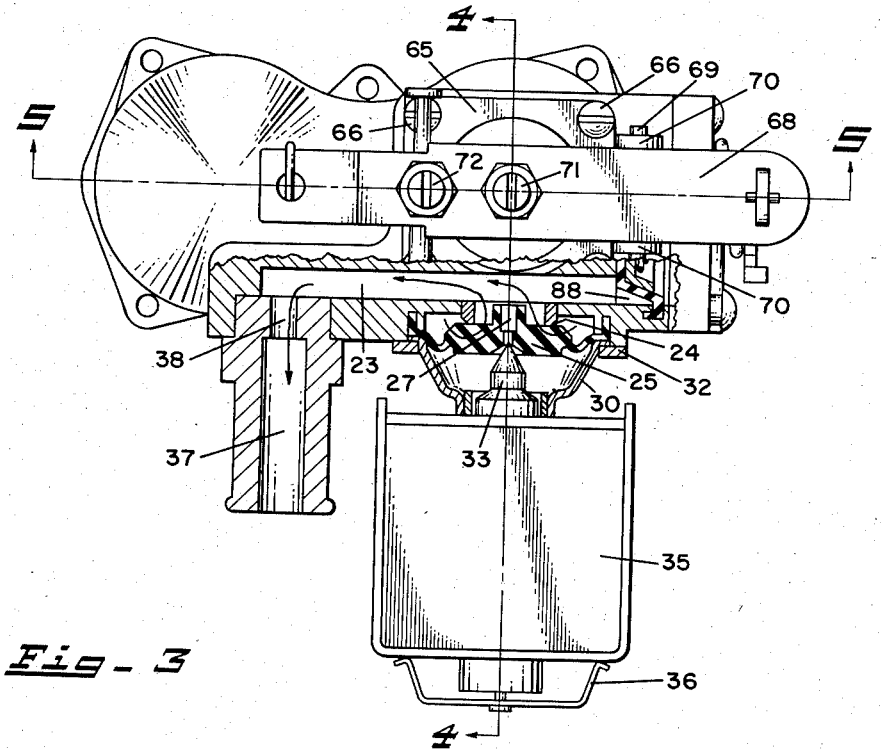
Fig. 3 is a plan view showing certain parts broken away.
Figure 4:
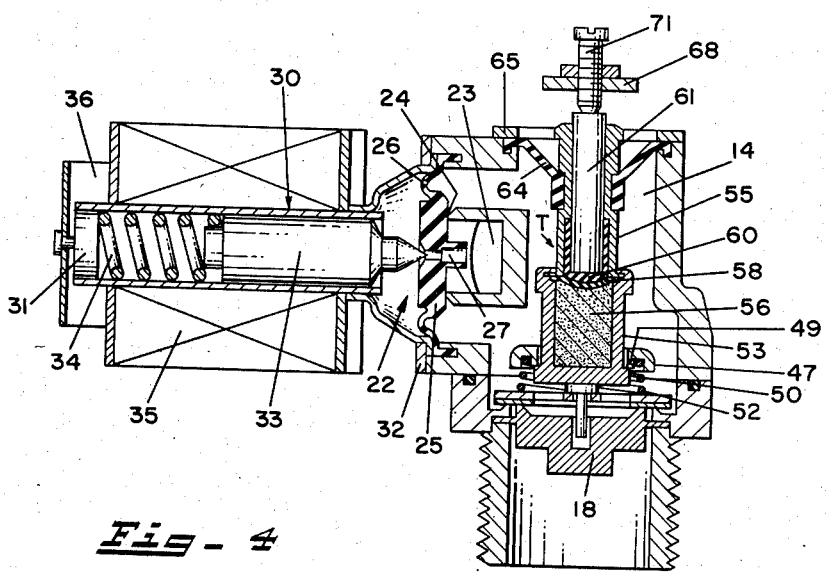
Fig. 4 is a sectional view taken substantially along line 4—4 of Fig. 3.
Figure 5:
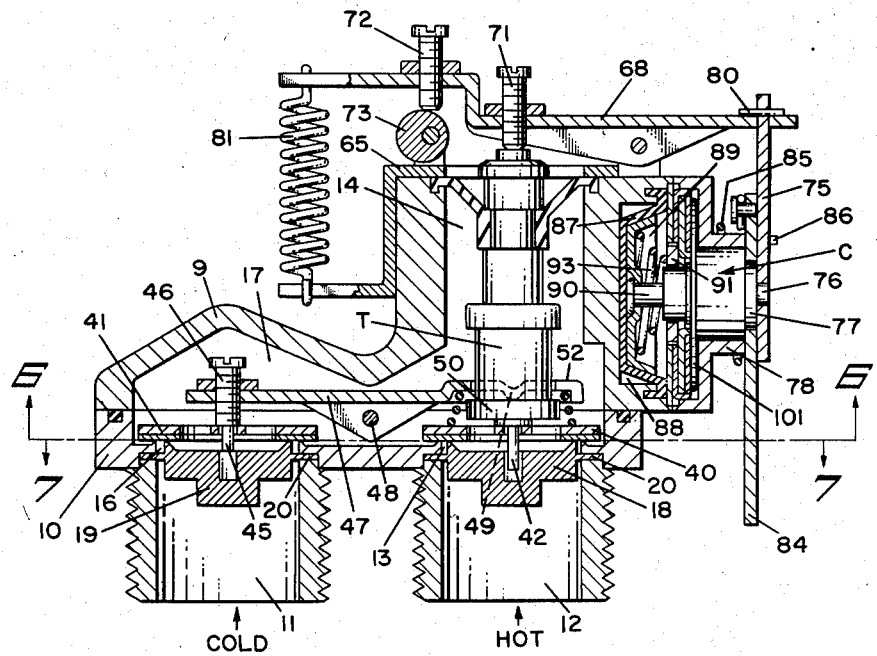
Fig. 5 is a sectional view taken substantially along line 5—5 of Fig. 3.

The upper end of mixing chamber 14 as seen in Figs. 4, 5 is closed in a manner described hereinafter and the outlet from the chamber comprises a pilot type shut-off valve mechanism of known construction and indicated generally at 22. As may be seen in Figs. 3 and 4 a passage 23 is formed in the valve body and one side wall of the passage has a circular valve seat 24 open to the mixing chamber 14 and on which a rubber valve member 25 is adapted to rest to close off the passage.

Valve member 25 has a relatively small bleed opening 26 and a larger central opening 27 which is aligned with the opening of valve seat 24 to outlet passage 23. The periphery of valve member 25 is flanged and tightly compressed in an annular groove in body member 9 and secured therein by the flanges of a flared sleeve 30 having its outer end closed by a plug 31 and which is secured to the body by a washer plate 32 attached to the body by screws, as shown. An armature 33 slides in the sleeve and a needle valve is formed on one end which closes off opening 27 when the armature is forced to the right, as viewed in Fig. 4 by a coil spring 34. Sleeve 30 is of nonmagnetic material such as brass, and is surrounded by a solenoid 35 secured in place by a spring clip 36. When armature 33 is closed on opening 27, water from mixing chamber 14 bleeds through opening 26 filling sleeve 30 and forcing valve member 25 against seat 24, and when the solenoid is energized the armature is withdrawn to the left from the valve member and opens the interior of the sleeve to outlet passage 23. Water escapes from the interior of the sleeve to outlet 23 faster than water passes through bleed opening 26 thereby reducing the pressure on the left hand side of valve member 25 below that in mixing chamber 14 whereby member 25 is forced from seat 24 which permits water in the mixing chamber to flow directly through seat 24 to outlet passage 23.

As seen in Fig. 3 outlet passage 23 leads to a discharge stem 37 to which a hose, not shown, leading to the tub of the washing machine may be connected. The discharge passage 38 of stem 37 is of smaller cross sectional area than that of passage 23 so that a pressure is produced in passage 23 when water flows through the valve mechanism.

The flow of hot and cold water through valve seats 13 and 16 is controlled by annular valve members or plates 40 and 41, as best seen in Fig. 5. These valve plates have openings in the central portion thereof to permit the flow of water therethrough and the centers have openings for the reception of guide pins, valve member 40 being guided on a pin 42 attached to the lower end of the shell of a thermostatic element T and valve member 41 being guided on a pin 45 formed on the end of a screw 46 threaded through a lever 47. As may be seen, the shoulder at the base of pin 45 engages valve plate 41 to force the plate to the valve seat. It will be noted that should the pressure in inlet 11 decrease below that in passage 17, valve plate 41 being free to close will seal against its valve seat and act as a check valve.

Lever 47 is pivoted on a pin 48 supported in opposite sides of member 10 and the end of the lever opposite that on which screw 46 is carried is forked and thermostatic element T is received between the tines of the fork. The tines have two V-bearings 49 formed thereon to engage the top side of a flange 50 formed about the thermostatic element. By this arrangement downward movement of the thermostatic element moves valve plate 40 toward its seat closing position and simultaneously rotates lever 47 clockwise, as seen in Fig. 5, which permits valve plate 41 to be removed from its seat by the cold water pressure and admit a greater flow of cold water to the mixing chamber. A light compression spring 52 is interposed between lever 47 and valve plate 40 to urge the valve plates to their respective seats. When the thermostatic element T moves upwardly, valve plate 40 may move from its seat by the water pressure and at the same time lever 47 is tilted counterclockwise for moving plate 41 to its seat closing position. It will be seen that the flow of hot and cold water will be proportioned according to the position of the thermostatic element T in the mixing chamber 14.

Thermostatic element T comprises a rigid shell, preferably of material having a high rate of heat conduction, formed of a cup-like member 53 having a barrel 55 attached over the opening thereof. Cup 53 contains suitable thermostatic material 56, such as a mixture of wax and metal particles, which expands as the temperature increases from 80° F. to 160° F. Material 56 is sealed in the cup by a rubber-like diaphragm 58 having its periphery crimped between the lower flanged end of barrel 55 and a top shoulder on the cup, the top edge of the cup being crimped against the lower flanged end of the barrel. A rubber-like cup 60 rests on diaphragm 58 and its upper edges abuts an annular shoulder formed inside the barrel, and a plunger 61 rests within the cup and projects from the upper end of the barrel.

The upper end of mixing chamber 14 is closed by a flexible diaphragm 64 having a central collared opening through which barrel 55 projects and the collar fits snugly in a groove about the barrel to provide a water-tight connection. The periphery of the diaphragm is tightly compressed in an annular groove about the open end of the chamber by a plate 65 attached to the valve body by screws 66.

An adjusting lever 68 is pivoted on a pin 69 supported in two up-turned lugs 70 formed on plate 65. An adjusting screw 71 threaded in lever 68 is arranged to be engaged by plunger 61 so that when material 56 in the thermostat expands plunger 61 will react against screw 71 and cause shell 53 to move relative to the plunger and actuate valve plates 40, 41, as described previously to regulate the flow of hot and cold water and maintain the temperature within mixing chamber 14 according to the position of screw 71 relative to plunger 61. It will be seen that water pressure in chamber 14 acting against diaphragm 64 urges thermostat T toward adjusting screw 71 and thereby maintains plunger 61 in engagement with the screw. It is to be understood, however, that the invention could be practiced by utilizing a spring to urge thermostat T upwardly, as viewed in the drawings, to urge the cold water inlet valve closed and the hot water inlet valve open.

Movement of lever 68 counter-clockwise, as viewed in Fig. 5, for example, is limited by a screw 72 threaded through lever 68 and engaging the periphery of a cam 73 journaled for rotation on bearings struck from plate 65, as shown. Cam 73 is positionable about its axis by a handle 74 to vary the height at which screw 72 is stopped, which determines the low temperature limit of operation of the mixing valve, as described more fully hereinafter. As shown, handle 74 has a stop lug 74' to engage plate 65 to limit rotation thereof.

Movement of lever 68 clockwise to change the position of screw 71 relative to plunger 61 is obtained by a link 75 having a crank pin 76 journaled therein and which pin is formed on a hub 77 journaled for rotation in a bearing plate 78 attached to body member 10 by screws 79. Pin 76 is offset relative to the axis of hub 77 so that as the hub rotates the pin moves link 75 longitudinally. The upper end of link 75 is connected to lever 68 by a lost motion connection formed by the link extending through a slot in lever 68 and a pin 80 through the link engaging the top side of the lever. Lever 68 is yieldingly held in engagement with pin 80 by a tension spring 81 having one end attached to the left hand end of lever 68 and the other end attached to a foot 82 on plate 65. This yielding connection is provided in case thermostatic element T should expand beyond the point to which valve plate 40 is closed on its seat without causing bending or rupturing of any part which would otherwise occur.

Hub 77 is rotatable by a handle 84 attached thereto and also by a torsion spring 85 having one end attached to the handle and the opposite end attached to one of the screws 79. Torsion spring 85 urges hub 77 to rotate handle 84 to a stop which is formed by an upturned lug 86 formed on the handle and which abuts an edge of link 75, as may be seen in Fig. 2. When handle 84 is in the position shown in Fig. 2, adjusting screw 72 engages cam 73 so that a minimum of expansion of the thermal material causes throttling of the hot water and an increase in cold water flow to maintain the water discharged at a relatively low temperature, such as that desired for rinsing of clothes.

Figure 1:
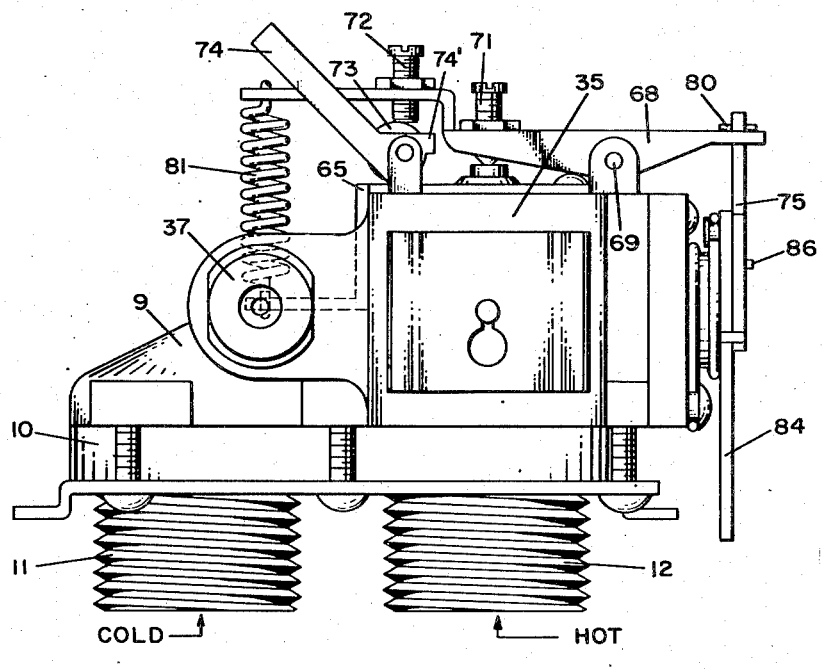
Figure 2:
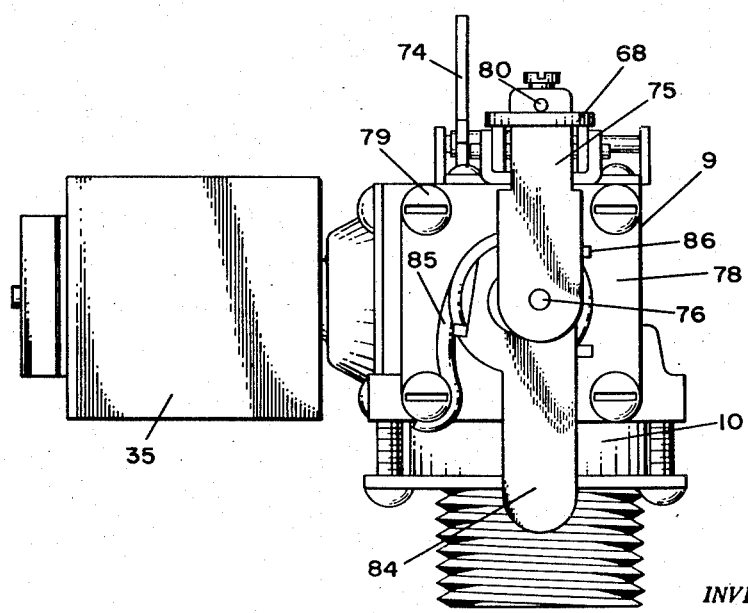
Fig. 2 is an end elevational view of the valve.

By turning handle 84 clockwise, as viewed in Fig. 2, adjusting lever 68 is tilted clockwise as seen in Fig. 5, moving screw 71 from plunger 61 so that increased expansion of thermostatic material 56 is required before throttling of the hot water occurs resulting in higher temperature of the water discharged from the valve mechanism.

It is desirable to cause adjusting handle 84 to remain at any temperature setting to which it may be moved during filling of the tub for the wash cycle and after the tub has been filled to permit torsion spring 85 to return the handle to the rinse water setting. To this end a friction slip-clutch mechanism is provided which is operated by pressure of water passing through outlet 23 to apply sufficient restraint to turning of hub 77 that the hub may be relatively easily rotated manually by handle 84 but which prevents movement of the hub by torsion spring 85. When valve member 25 closes and water ceases to flow in the outlet passage 23, as at the conclusion of the tub filling cycle of operation, the clutch is rendered inoperative to hold the hub, and the torsion spring returns it to the rinse temperature setting where it remains until re-adjustment of handle 84 is made.

Figure 8:
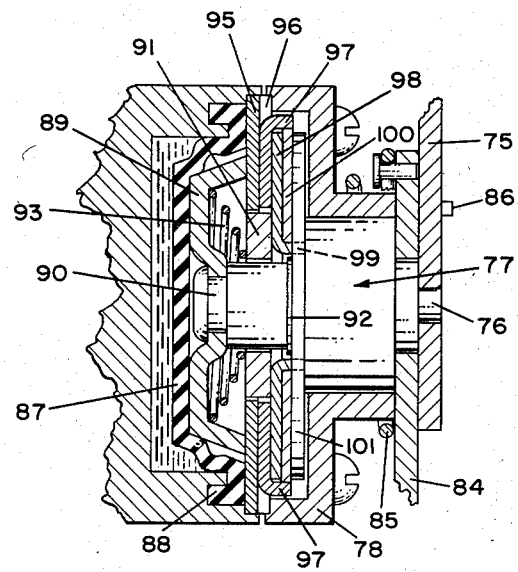
Fig. 8 is a fragmentary view, on a larger scale, of the clutch mechanism shown in section in Fig. 5 but showing certain parts in different positions.

The clutch mechanism comprises a dish-shaped elastic diaphragm 87, best seen in Fig. 8, which rests in a shallow cylindrical recess 88 formed in one end of body member 10 and its periphery is sealed about the edges of the recess in a manner described more fully hereinafter. As seen in Fig. 3 the recess 88 is open to the outlet passage 23 and diaphragm 87 forms a flexible seal to respond to the pressure of the water in the outlet passage. The diaphragm 87 engages a correspondingly dish-shaped piston 89 having a stud 90 attached thereto. A ring 91 surrounds the stud and is pressed against a head 92 on the stud by a compression spring 93. A flat annular metal plate 95 abuts the peripheral portion of diaphragm 87 and surrounds ring 91 and the edges of the opening therethrough form a guide for the ring. A clutch disc 96 engages plate 95 and is provided with two oppositely disposed lugs 97 which project to the right into notches formed in the periphery of a second clutch disc 98. Disc 98 has two opposed inwardly projecting fingers or spurs 99 which project into two recesses in the inner face of hub 77 to form a driving connection therewith. A third clutch disc 100 engages disc 98 and has slots in opposite edges of the periphery thereof to receive lugs 97 of clutch plate 96, the central opening in the disc 100 receiving spurs 99. By this arrangement clutch discs 96, 100 are keyed together through lugs 97 engaging edges of the slots in disc 100, and clutch disc 98 is keyed to hub 77, which has a disc flange 101 formed thereon and which rests against clutch disc 100. Bearing plate 78 retains the clutch mechanism in place and clamps plate 95 against the periphery of clutch diaphragm 87 to secure it in the groove about clutch recess 88.

When no water is flowing through outlet passage 23, washer 95, and discs 96, 98, 100, and 101 have relatively little friction therebetween so that torsion spring 85 may move handle 84 to its low setting position as described. When the solenoid valve 22 is energized and valve member 25 opens to permit flow of water from mixing chamber 14 through outlet passage 23 pressure of water in the passage forces diaphragm 87 outwardly, moving piston 89 against washer 95 thereby compressing spring 93 which urges ring 91 against clutch plate 96 causing friction between flange 101 and disc 98 respectively which friction applies a "drag" to movement of handle 84 by the torsion spring but which permits manual movement of the handle so that it may be adjusted by the user to the temperature setting desired for the wash cycle. In practice, the handle 84 can be attached by a cable or other means to a dial adjusting arrangement on a splash board of the washing machine having suitable indicia by which the user could select the temperature settings desired.

After the tub of the machine has been filled by wash water at the temperature desired, the solenoid valve is de-energized to shut off the water flow to the tub, thereby causing drop in the pressure in discharge passage 23 which releases the friction clutch and permits torsion spring 85 to return the handle 84 to the low temperature setting. During the subsequent tub filling cycles, the mixing valve will furnish water at rinsing temperatures. Thus, it may be seen that when the user of the washing machine starts a washing cycle the desired washing water temperature may be achieved, after which the valve mechanism automatically furnishes water at rinsing temperatures for the subsequent rinse cycle so that no attention of the user is necessary to reduce the temperature setting.

The rinse water temperature is readily adjustably by movement of handle 74 to rotate cam 73 and change the position at which lever 68 is blocked in its counterclockwise movement, and handle 74 may be attached by a cable or the like to suitable dial mechanism on the splash board of the washing machine so that the user may set the rinse water temperature control at that desired.

It will be seen that the objectives of the invention have been achieved and that other forms, modifications and adaptations of the invention could be made all of which fall within the scope of the following claims.

I claim:

1. In a mixing valve, including valve means to vary the proportional flow of relatively warm and cool fluids into a chamber, the combination of a thermostatic element responsive to the temperature of liquid in said chamber to operate said valve means, manually operable means to adjust the operative effect of said element on said valve means for selectively regulating the temperature of the liquid flowing through said chamber and comprising a movable member, biasing means to urge said member to one adjusting position, means to control the flow of liquid from said chamber, and slip clutch means operative by pressure of fluid flowing through the valve to hold said member in manually selected positions against the urging of said biasing means and responsive to a cessation of flow through said mechanism to release said member for movement to said one position by said biasing means.

2. In a mixing valve, including valve means to vary the proportional flow of relatively warm and cool fluids into a chamber, the combination of a thermostatic element responsive to the temperature of liquid in said chamber to operate said valve means, manually operated adjusting means to adjust the operative effect of said element on said valve means for selectively regulating the temperature of the liquid flowing through said chamber and comprising a movable member, biasing means to urge said member to one adjusting position, means to control the flow of liquid from said chamber, and slip clutch means operative by pressure of fluid flowing from said chamber to hold said member in manually selected positions against the urging of said biasing means but yielding to manual operation of said adjusting means and responsive to a decrease in said pressure to release said member for movement to said one position by said biasing means.

References Cited in the file of this patent

UNITED STATES PATENTS

| | | |
|---|---|---|
| 214,286 | Enright | Apr. 15, 1879 |
| 1,024,729 | Lawler | Apr. 30, 1912 |
| 2,154,108 | Olson | Apr. 11, 1939 |
| 2,199,129 | Hamilton | Apr. 30, 1940 |
| 2,234,795 | Brown | Mar. 11, 1941 |
| 2,444,631 | Chace | July 6, 1948 |
| 2,548,516 | Cantalupo et al. | Apr. 10, 1951 |
| 2,593,521 | Ball | Apr. 22, 1952 |
| 2,628,781 | Cantalupo | Feb. 17, 1953 |